2,723,266

PROCESS FOR PRODUCING AMIDES AND LACTAMS

James Lincoln and Irene Marianne Cohn, London, and Walter Henry Groombridge, Spondon, near Derby, England, assignors to British Celanese Limited, a corporation of Great Britain No Drawing. Application May 12, 1953, Serial No. 354,648

Claims priority, application Great Britain May 15, 1952

10 Claims. (Cl. 260—239.3)

This invention relates to improvements in the production of amides and is especially concerned with their production by the transformation of oximes.

As is well known, oximes of acyclic or cyclic ketones may be transformed by treatment with sulphuric acid, oleum, chlorsulphonic acid, phosphorus pentachloride or like strongly acid reagents into amides which are cyclic lactams if the starting material is a cyclic ketone. This is the well known Beckmann transformation or rearrangement. This process has found its greatest commercial application in the production of caprolactam from cyclohexanone by first forming the oxime and then transforming to caprolactam. A well known process for this commercial production is the treatment of cyclohexanone oxime with concentrated sulphuric acid or oleum. When the transformation is complete the acid liquor is neutralised with ammonia or caustic soda or caustic potash and the resulting sulphate crystallised from the reaction liquor so as to leave substantially only the lactam in the liquor. Commercially it is advantageous to neutralise with ammonia because the resulting ammonium sulphate can be sold as fertiliser and therefore does not represent a complete loss both of the sulphuric acid and the neutralising agent.

We have found that this Beckmann transformation may be carried out with sulphuric acid or oleum or like strong acid partly neutralised with ammonia. Thus, for example, we have found that ammonium bisulphate $(NH_4)HSO_4$ is quite adequate for effective transformation of the oximes to the corresponding lactams or other amides, and that the reaction liquor, after the transformation is complete, may be neutralised with ammonia, thus obtaining ammonium sulphate which may be separated from the reaction liquor by crystallisation. After separation, the ammonium sulphate may be heated so as to drive off ammonia which may be absorbed in water or other appropriate medium ready for re-use in a further neutralisation step, leaving behind ammonium bisulphate for further use in the transformation itself. Thus in the case of using ammonium bisulphate as the acid reagent for the Beckmann rearrangement there is a completely cyclic process in which, apart from ordinary processing losses, all the reagents are regenerated and re-used. By this means a very considerable economy is effected in the production of the lactams or other amides.

The ammonium bisulphate has a melting point of about 146° C. whereas the usual temperatures for carrying out the Beckmann rearrangement are about 100–125° C. For the purpose of maintaining the reactants in liquid form, steps may either be taken to reduce the melting point of the ammonium bisulphate so that the oxime can be run into the transforming reagent already raised to reaction temperature, or alternatively a reaction medium may be used which will enable the reaction to be carried out at a higher temperature, for example a temperature of the order of 125–145 or 150° C.

To reduce the melting point of the ammonium bisulphate, a number of devices are available. For example, a small quantity of water may be used together with the ammonium bisulphate with this object in view. Such quantities of water may amount to up to 20% of the weight of the ammonium bisulphate. Generally, however, we find that the yield of lactam is improved if the reaction is carried out under substantially anhydrous conditions, for example with not more than about 5% of water present based on the ammonium bisulphate. Still better results are obtained by using quantities of water much less than this up to completely anhydrous conditions. A very convenient method of reducing the melting point of the ammonium bisulphate while carrying out the reaction under substantially anhydrous conditions is to mix with the amonium bisulphate a small quantity, e. g. up to 10 or 15%, of mono-ammonium di-hydrogen phosphate $(NH_4)H_2PO_4$. Other salts or fluxes may, however, be used for the purpose of reducing the melting point.

The reaction medium into which the oxime is run may consist substantially of ammonium bisulphate with or without small quantities of water and with any added ammonium dihydrogen phosphate or other flux, or the reaction may be carried out in a medium which is liquid at ordinary temperatures and dissolves the ammonium bisulphate and any flux that is present. Acetic acid is a most suitable medium for this purpose and its use as the reaction medium is the preferred method of carrying out the invention. It enables the reaction to be carried out under conditions which are either completely anhydrous or very nearly anhydrous. For example, the only water present may be that brought in by the addition of crystalline ammonium sulphate to commercial 98% sulphuric acid and the small amount of water that is present in commercial acetic acid. However, even this small amount of water may be eliminated by adding to such a reaction mixture the requisite amount of acetic anhydride to combine with the small amount of water present.

While the transforming reagent, particularly ammonium bisulphate, any flux and the medium together with the oxime may be mixed in the cold and the whole brought to reaction temperature, it is preferred to add the oxime to the remainder of the reaction mixture already brought to reaction temperature. As previously indicated, the reaction temperature for this type of reaction medium is preferably of the order of 100–125° C. Quite high yields are obtainable in a very short reaction time, for example a reaction time of the order of ¼ hour, though no loss of yield appears to be entailed by prolonging the period to 1 hour or more.

Another means of reducing the melting point of ammonium bisulphate is to add small amounts of sulphuric acid. Thus, for example, a reaction medium consisting of equimoles of ammonium bisulphate and sulphuric acid has a melting point of about 40° C. Such a reaction medium is preferably used without acetic acid and is preferably used in the anhydrous or substantially anhydrous state. However, in order to reduce the melting point of ammonium bisulphate to a temperature within the preferred range of reaction temperatures, it is not necessary to add as much as one mole of sulphuric acid to each mole of ammonium bisulphate, and smaller quantities, for example 0.1–0.25 or 0.5 mole may be used. In this aspect of the invention the full advantage of recovering substantially the whole of the reagents for re-use is not obtained, and after neutralisation of the reaction mixture with ammonia some ammonium sulphate has to be discarded and some fresh sulphuric acid brought into the process. However, even in this method of carrying out the invention there is a substantial advantage as compared with the known process of using sulphuric acid as the transforming agent, neutralising the reaction mixture with ammonia and discarding the whole of the ammonium sulphate. As already indicated, we may as an alternative use a reaction medium which enables a higher reaction temperature to be achieved, and especially reaction temperatures between 130 and 150 or 160° C. Generally for this purpose we use liquids having higher boiling points than has acetic acid. Preferably the liquid medium is a good solvent for the oxime, for ammonium bisulphate and for any other constituents of the mixture, for instance free sulphuric acid or mono-ammonium dihydrogen phosphate. The chloracetic acids are very valuable for this purpose since not only are their boiling points higher than that of acetic acid but in addition they have improved solvent power for the ammonium bisulphate. Either monochlor-, dichlor- or trichlor-acetic acid may be used. It is convenient to use a mixture of the chlorinated acetic acid and acetic acid so proportioned that, when the other constituents of the reaction mixture are dissolved, the boiling point of the whole is the reaction temperature which is desired. For example, a mixture of 35–45 parts by weight of acetic acid with 40–50 parts by weight of monochloracetic acid boils at about 140–142° C. In this way the reaction may be carried out under reflux, thus holding the temperature at the required point.

As already indicated, such mixtures have a better solvent power for ammonium bisulphate than has acetic acid itself. In addition the conversions to lactam or other amide are higher.

Instead of or in addition to using acetic acid or a mixture of acetic acid and a chlorinated acetic acid as a reaction medium, the product of the reaction, e. g. caprolactam, may be used, particularly if its melting point is below the reaction temperature, as is the case with caprolactam itself. In such a method the caprolactam or other reaction product may be mixed with the ammonium bisulphate and with any other reaction medium that is desired, such as acetic acid, the whole brought to reaction temperature and the oxime run in. The use of caprolactam or other readily fusible amide in this way has the advantage that it promotes homogeneity of the reaction mixture and in addition the process may readily be carried out continuously by continuous circulation of the reagents through a heated reaction zone and withdrawal and extraction of reaction product and ammonium sulphate from some of the reaction product and continuous feed in of ammonium bisulphate regenerated from the ammonium sulphate withdrawn and continuous feed in of oxime.

Generally we prefer to use as reaction medium acetic acid or a mixture of acetic acid with a chlorinated acetic acid or other liquid medium which completely dissolves the ammonium bisulphate and any flux which is present, so that the mixture is homogeneous at the time of adding the oxime and preferably remains so throughout the reaction.

The following examples illustrate the invention as applied to the production of caprolactam.

*Example 1*

A reaction mixture was made up with 115 parts by weight of ammonium bisulphate, 15 parts by weight of ammonium di-hydrogen phosphate and 80 parts by weight of acetic acid, and brought to a temperature of 123° C. under a reflux condenser. 25 parts by weight of cyclohexanone oxime were added gradually and the temperature was maintained for ½ hour, by which time most of the oxime had been transformed. The reaction mixture was cooled and sufficient aqueous ammonia added to transform the ammonium bisulphate to ammonium sulphate, which was precipitated and filtered off. The crude lactam liquor was then extracted and worked up in the usual way. The conversion to lactam was about 59%. The ammonium bisulphate was washed and heated until a stoichiometric quantity of ammonia (1 mole) had been driven off, the ammonia being collected in water and reserved for the neutralisation of a further batch. The ammonium bisulphate thus formed was used in the transformation of a further batch of oxime.

*Example 2*

A reaction mixture was made up with 114 parts by weight of ammonium bisulphate, an amount of 98% sulphuric acid corresponding with 10.65 parts of 100% sulphuric acid, 15 parts of mono-ammonium di-hydrogen phosphate and 74 parts of glacial acetic acid. This mixture was brought to a temperature of 124° under a reflux condenser and 25 parts by weight of cyclohexanone oxime added gradually and the temperature maintained for 30 minutes. The mixture was then worked up as described in Example 1. The conversion to lactam was 74%.

*Example 3*

A reaction mixture was made up with 113 parts by weight of ammonium bisulphate, 35 parts by weight of glacial acetic acid and 43 parts by weight of monochloracetic acid. The reaction mixture was brought under reflux to a temperature of about 140° C. and 18 parts by weight of cyclohexanone oxime gradually run in. The temperature was maintained for 13 minutes. Throughout this period the whole of the reaction mixture remained liquid. At the end of the 13 minute reaction period the acids were neutralised and the product worked up as described in Example 1. The conversion to lactam was 77%.

*Example 4*

A reaction mixture was made up with 166 parts by weight of ammonium bisulphate, 45 parts by weight of glacial acetic acid and 45 parts by weight of monochloracetic acid. The mixture was brought to about 141° C. under reflux and 25 parts by weight of cyclohexanone oxime gradually added. The temperature was maintained for 20 minutes and the reaction mixture worked up as before. The conversion to lactam was 83%.

While the invention is of greatest commercial value in the transformation of cyclohexanone oxime to caprolactam, it may be employed in the transformation of other oximes of cyclic ketones to lactams, for example suberone oxime to the corresponding lactam, or may be used for the transformation of acyclic ketones to amides, for example benzophenone to benzanilide and diethyl ketone to propionethylamide.

Having described our invention, what we desire to secure by Letters Patent is:

1. Process of an amide by the Beckmann rearrangement of the corresponding oxime, which comprises the step of using a catalyst comprising a mixture of ammonium bisulphate and at most an equimolecular proportion of sulphuric acid.

2. Process for the production of a cyclic amide by the Beckmann rearrangement of the corresponding oxime, which comprises the step of using a catalyst comprising a mixture of ammonium bisulphate and at most an equimolecular proportion of sulphuric acid.

3. Process according to claim 2, wherein the rearrangement is carried out in a medium containing acetic acid.

4. Process for the production of caprolactam from cyclohexanone oxime according to claim 2, wherein the rearrangement is carried out in a medium containing acetic acid and at a temperature betwen 100 and 125° C.

5. Process according to claim 2, wherein the rearrangement is carried out in a medium containing a chlorinated acetic acid.

6. Process for the production of caprolactam from cyclohexanone oxime according to claim 2, wherein the rearrangement is carried out in a medium containing acetic acid and monochloroacetic acid at a temperature between 130 and 150° C.

7. Process according to claim 2, wherein a flux is used to reduce the melting point of the ammonium bisulphate.

8. Process according to claim 2, wherein monoammonium dihydrogen phosphate is used to reduce the melting point of the ammonium bisulphate.

9. A cyclic process for the production of an amide by the Beckmann rearrangement of the corresponding oxime, which comprises using ammonium bisulphate as catalyst for the Beckmann rearrangement, neutralizing the rearrangement mixture with ammonia, separating the resulting ammonium sulphate, decomposing the ammonium sulphate to ammonium bisulphate and ammonia, recycling the ammonium bisulphate to the rearrangement mixture and recycling the ammonia to neutralize the rearrangement mixture.

10. A cyclic process for the production of caprolactam by the Beckmann rearrangement of cyclohexanone oxime, which comprises using ammonium bisulphate as catalyst for the Beckmann rearrangement, neutralizing the rearrangement mixture with ammonia, separating the resulting ammonium sulphate, decomposing the ammonium sulphate to ammonium bisulphate and ammonia, recycling the ammonium bisulphate to the rearrangement mixture and recycling the ammonia to neutralize the rearrangement mixture.

References Cited in the file of this patent

UNITED STATES PATENTS

| | | |
|---|---|---|
| 2,234,566 | Lazier et al. | Mar. 11, 1941 |
| 2,249,177 | Schlack | July 15, 1941 |
| 2,351,381 | Wiest | June 13, 1944 |
| 2,605,261 | Kahr | July 29, 1952 |

OTHER REFERENCES

Fieser et al., "Organic Chemistry" (Heath), pp. 715–716 (1944).

UNITED STATES PATENT OFFICE
CERTIFICATE OF CORRECTION

Patent No. 2,723,266

November 8, 1955

James Lincoln et al.

It is hereby certified that error appears in the printed specification of the above numbered patent requiring correction and that the said Letters Patent should read as corrected below.

Column 4, line 49, after "Process" insert -- for the production --.

Signed and sealed this 22nd day of October 1957.

(SEAL)
Attest:

KARL H. AXLINE
Attesting Officer

ROBERT C. WATSON
Commissioner of Patents